(12) United States Patent
Kouno et al.

(10) Patent No.: US 7,771,766 B2
(45) Date of Patent: Aug. 10, 2010

(54) APPARATUS AND METHOD FOR FREEZE-STORING BAKED FOOD

(75) Inventors: Shinji Kouno, Koto-ku (JP); Kou Ishikura, Koto-ku (JP); Satoshi Shinozaki, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 690 days.

(21) Appl. No.: 11/556,950

(22) Filed: Nov. 6, 2006

(65) Prior Publication Data

US 2007/0110867 A1 May 17, 2007

Related U.S. Application Data

(63) Continuation of application No. PCT/JP2005/008297, filed on May 2, 2005.

(30) Foreign Application Priority Data

May 7, 2004 (JP) ............................. 2004-139128

(51) Int. Cl.
*A21D 15/02* (2006.01)

(52) U.S. Cl. .................. 426/444; 426/497; 426/506; 426/524; 62/64; 62/65

(58) Field of Classification Search ................ 426/231, 426/549, 444, 496, 497, 506, 511, 524; 62/1, 62/65, 64
See application file for complete search history.

(56) References Cited

U.S. PATENT DOCUMENTS

| | | | | |
|---|---|---|---|---|
| 2,237,257 A | * | 4/1941 | Finnegan | 62/63 |
| 2,804,192 A | * | 8/1957 | Armstrong et al. | 198/369.2 |
| 3,512,991 A | * | 5/1970 | Mancuso et al. | 426/385 |
| 4,303,687 A | * | 12/1981 | Ratjen | 426/497 |
| 4,366,178 A | * | 12/1982 | Reynolds et al. | 426/393 |
| 4,475,351 A | * | 10/1984 | Klee | 62/63 |
| 4,562,701 A | * | 1/1986 | Newsome et al. | 62/187 |
| 4,861,601 A | * | 8/1989 | Seneau | 426/19 |
| 4,991,403 A | | 2/1991 | Kirchhoff | |
| 5,346,715 A | * | 9/1994 | Fertel | 426/524 |
| 2007/0084321 A1 | * | 4/2007 | Ciambella et al. | 83/13 |
| 2007/0166444 A1 | * | 7/2007 | Narumiya et al. | 426/524 |

FOREIGN PATENT DOCUMENTS

| | | | |
|---|---|---|---|
| JP | 5236862 A | * | 9/1993 |
| JP | 9-163918 A | | 6/1997 |
| JP | 9-233994 A | | 9/1997 |
| JP | 10-23857 A | | 1/1998 |

(Continued)

*Primary Examiner*—Drew E Becker
(74) *Attorney, Agent, or Firm*—Rossi, Kimms & McDowell LLP (57) ABSTRACT

An apparatus and a method for freeze-storing baked foods allow the baked foods to retain excellent crust condition (surface layer of baked foods), avoiding any peeling, and retain excellent sensory condition, attaining long-term frozen storage. Baked foods, including baked bread and baked confectionery, are frozen in a humidified atmosphere, cooled to 30 to 35° C. in terms of core temperature, and subjected to a high-humidity cooling process conducted in an atmosphere, where even upon receiving high-temperature baked foods after baking, 20 to 28° C. and ≧65% RH, high humidity condition can be maintained, and further subjected to a frozen storage process where the baked foods are freeze stored at low temperature of ≦freezing temperature.

10 Claims, 8 Drawing Sheets

11: Baking process
12: Humidifying process
13: Cooling process
14: Plain wrapping process
15: High humidity freeze-storing process
16: Low humidity freeze-storing process

FOREIGN PATENT DOCUMENTS

| | | |
|---|---|---|
| JP | 10-84848 A | 4/1998 |
| JP | 10-262543 A | 10/1998 |
| JP | 11-346644 A | 12/1999 |
| JP | 2003-219794 A | 8/2003 |
| JP | 2003219794 A * | 8/2003 |
| WO | 88/02988 A1 | 5/1988 |

* cited by examiner

8: Retrieve
9: Pack and transport

FIG. 2

| No. | Water spray condition | Cooling | | Freezing | |
|---|---|---|---|---|---|
| | | Temperature setting | Target crumb temperature | Temperature setting | Target crumb temperature |
| 1 | Spray on the crust | 25°C | 30°C | -40°C | -10°C and below |
| 4 | No spray | 25°C | 30°C | -40°C | -10°C and below |
| 5 | Spray on the crust | 10°C | 45°C | -40°C | -10°C and below |
| 6 | Spray on the crust | 10°C | 30°C | -40°C | -10°C and below |

FIG. 3

| No. | Cooling | | | Freezing | | Weight balance |
|---|---|---|---|---|---|---|
| | Inlet crumb temperature | Bread weight | Outlet crumb temp. | Outlet crumb temperature | Bread weight | |
| 1 | 90.2°C | 541.6g | 31.1°C | -18.7°C | 531.8g | -9.8g |
| 4 | 92.5°C | 536.8g | 34.1°C | -12.9°C | 530.5g | -6.8g |
| 5 | 84.8°C | 530.0g | 45.5°C | -11.8°C | 547.1g | +17.1g |
| 6 | 95.0°C | 497.6g | 29.9°C | -18.7°C | 490.0g | -0.6g |

FIG.4

Test No. 1,4

FIG.5

Test No. 5

FIG.6

Test No. 6

FIG. 7

| No. | Inlet crumb temperature | Cooling | | | | Freezing | | Cooling and Freezing | Remark |
|---|---|---|---|---|---|---|---|---|---|
| | | Cooling condition (Temp., Humidity, Wind speed) | Outlet crumb temperature | Time(min) (A) | Temp. setting | Time(min) to crumb temp. -10°C | Time(min) to crumb temp. -18°C (B) | Total Time(min) (A)+(B) | |
| 1 | 90.2°C | 26.7°C, 49%RH, 1.46m/s (plus water spray) | 31.1°C | 62 | -35 to -40°C | 66 | 98 | 160 | Present invention |
| 4 | 92.5°C | 26.7°C, 65%RH, 1.46m/s | 34.1°C | 62 | -35 to -40°C | 96 | - | - | Present invention |
| 5 | 84.8°C | 6.2°C, 41.5%RH, 1.46m/s (plus water spray) | 45.5°C | 26 | -35 to -40°C | 102 | - | - | Comparative example |
| 6 | 95.0°C | 5.9°C, 38%RH (plus water spray) | 29.9°C | 49 | -35 to -40°C | 93 | - | - | Comparative example |

FIG.8

11: Baking process
12: Humidifying process
13: Cooling process
14: Plain wrapping process
15: High humidity freeze-storing process
16: Low humidity freeze-storing process

FIG. 9

| Case No. | Cooling humidity | Post-cooling temperature (°C) | Freezing humidity | Freeze-storing temperature(°C) | Storing time (days) | Crust condition | Sensory condition | Quality |
|---|---|---|---|---|---|---|---|---|
| 1 | High | 30 to 33 | High | −17 to −18 | 10 to 40 | No crust flaking No deterioration | Excellent | ○ |
| 2 | High | 30 to 33 | High | −18 to −19 | 20 to 50 | No crust flaking No deterioration | Excellent | ○ |
| 3 | High | 30 to 33 | Low after short term high | −17 to −18 | 10 | No crust flaking No deterioration | Excellent | ○ |
| 4 | Low | 1.8 to 2.3 | High humidity | −17 to −18 | 10 to 30 | Crust flaking and deterioration | Dry crust | × |
| 5 | Low | 1.8 to 2.3 | Low humidity | −17 to −18 | 10 to 30 | Crust flaking and deterioration | Crust depression | × |
| 6 | Low | 1.8 to 2.3 | High humidity | −17 to −18 | 1 | Crust flaking and deterioration | Crust depression | × |

11: Baking process
21: Cooling process in cooling chamber
22: Low humidity freeze-storing process

APPARATUS AND METHOD FOR FREEZE-STORING BAKED FOOD

This is a continuation of International Application PCT/JP2005/008297 (published as WO 2005/107480) having an international filing date of 2 May 2005, which claims priority to JP 2004-139128 filed on 7 May 2004. The disclosure of the priority application, in its entirety, including the drawings, claims, and the specification thereof, is incorporated herein by reference.

BACKGROUND

Figure 11:
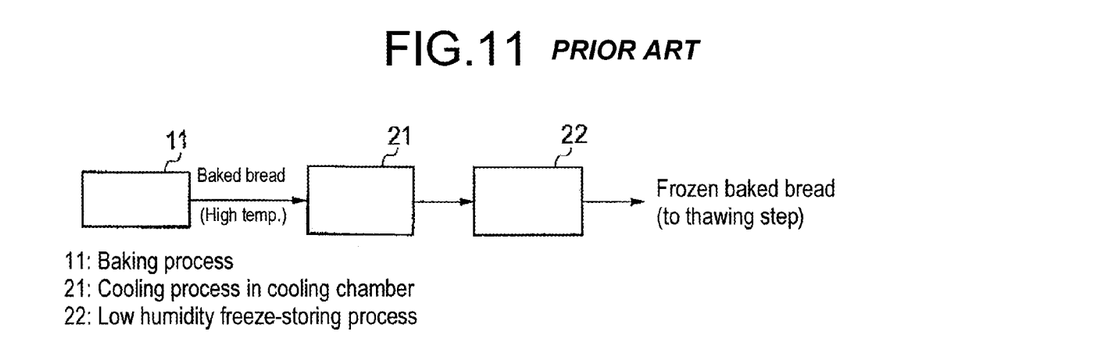
FIG. 11 schematically illustrates a conventional freeze-storing system.

To reduce the cost of making and distributing bread, distributors and bakeries recently adopted a method of freeze-storing baked bread at low temperature by introducing cooling air and then cooking the frozen bread to thaw and sell the bread restored to near fresh baked state. Referring to FIG. 11, conventionally, baked bread is stored frozen after the bread is baked in a baking process 11, and the baked bread whose surface temperature is 85° C. and above is cooled in a cooling process 21 for preliminarily cooling baked bread at high temperature in a cooling chamber at approximately −5° C. and below to make the surface temperature approximately 1 to 3° C. In a freeze-storing process 22, the cooled bread is frozen to about −20° C. and at 50 to 70% RH to prepare for storing.

Another related art discloses a method of freeze-storing bread while the bread is carried on a conveyor through a cooling chamber from an entrance to an exit and through a freezing chamber from an entrance to an exit. The conveyor carries bread thereon at a constant speed through the cooling chamber and the freezing chamber in which bread is cooled and frozen. According to this method, the bread is cooled in the cooling chamber while humidified air (pre-mixed with spray water) is supplied to the exit side and freeze-stored in the freezing chamber in which temperature is maintained at approximately −20° C. to be ready for the shipment.

Japanese patent publication JP 11-346644A proposes another method of freeze-storing baked bread and confectionery. Here, fresh cakes are quickly frozen to bring its core temperature to 0° C. and below, stored at −18° C. and below and at high humidity, and thawed in a cool room of 0° C.±2° C. and at 50 to 70% RH. Cakes include sponge cakes and bread made from dough containing more than 40% soluble sugar in weight ratio of solid ingredients. This publication, however, does not disclose a method of freeze-storing baked bread for a long period, retaining excellent quality of the crust (surface layer of bread), good sensory condition, and preventing crust flaking.

According to the inventors' tests, if the freezing process is performed for longer than a predetermined period, the baked bread processed by a conventional freeze-storing method shows crust staling and flaking, resulting in a weight decrease, thereby losing good texture and its commercial value. Moreover, In the conventional method, the exit side of the cooling chamber supplies humidified air, which is humidified by spraying cold water to air at room temperature. When water contained in the humidified air evaporates, taking evaporative latent heat from the surrounding, the ambient temperature decreases at the exit side of the cooling chamber, causing a temperature difference between the entrance side and exit side of the cooling chamber, which causes a drop in relative humidity inside the cooling chamber. This can deteriorate the quality of the baked bread.

There still remains a need for improving the quality of freeze-stored baked goods so that they can be restored more closely to their original baked condition, namely to retain excellent crust quality of baked food and also to prevent crust flaking while maintaining the quality and sensory condition of fresh baked food even after a long period of freeze-storing. The present invention addresses this need.

SUMMARY OF THE INVENTION

The present invention relates to an apparatus and a method for freeze-storing baked goods, such as baked bread and confectionary in a humidified atmosphere.

One aspect of the present invention is an apparatus for freeze-storing baked food in an atmosphere of high or medium humidity. The apparatus comprises a cooling chamber, a pre-mixing device, a freezing chamber, and at least one conveyor. The cooling chamber is maintainable at room temperature and high or medium humidity. The pre-mixing device pre-mixes air at room temperature with warm water spray and introduces the pre-mixed air into the cooling chamber. The freezing chamber is maintainable below the freezing point of the baked food and below. The conveyor conveys the baked food in and out of the cooling chamber and the freezing chamber. The cooling chamber and freezing chamber are provided separately. The period of freezing the baked good in the freezing chamber is longer than the period of cooling the baked good in the cooling chamber.

The pre-mixed air from the pre-mixing device is introduced to an exit side of the cooling chamber, and ambient temperature on the exit side of the cooling chamber is controlled to be near the room temperature, which is about the same as the ambient temperature on an entrance side of the cooling chamber. The freezing chamber is at the freezing point and below and at lower humidity than the cooling chamber.

When the cooling chamber is maintained medium humidity of 45-60% RH, water is sprayed on the surface of the baked food before introducing the baked food into the cooling chamber.

Another aspect of the present invention is a method of freeze-storing baked food. The method includes a cooling step of cooling the baked food in a cooling chamber having an atmosphere of high or medium humidity, a first freezing step of freeze-storing the baked food in an atmosphere of the freezing point and below and high humidity after the cooling step, and a second freezing step of freeze-storing the baked food in an atmosphere of the freezing point and below and humidity lower than the first freezing step after the first freezing step. The second freezing step is performed for a longer period than the first freezing step, and when the cooling chamber has the atmosphere of medium humidity, the surface of the bake food can be sprayed with water before the cooling step.

The cooling step includes pre-mixing air at room temperature with warm water spray, and introducing the pre-mixed air into the cooling chamber. The temperature of the water spray is higher than that of the pre-mixed air. The pre-mixed air can be introduced into an exit side of the cooling chamber having the atmosphere of high humidity. The temperature of the atmosphere of the exit side of the cooling chamber is thus controlled to be at room temperature, which is approximately the same as that of an entrance side of the cooling chamber.

The cooling step is performed to cool the baked food so that the core (crumb) of the baked food is at the temperature of 30 to 35° C., and the atmosphere of the cooling chamber is maintained highly humid at 20 to 28° C. and 65% RH and above, even when the pre-mixed air is introduced therein. When the relative humidity of the cooling chamber during the cooling step is between 45% RH and 60% RH, water is sprayed on the surface of the baked food before the cooling step.

The baked food can include half-baked bread and fully baked bread. The cooling step includes pre-mixing air at room temperature with warm water spray and introducing the pre-mixed air into the cooling chamber at high humidity. The temperature of the water spray is higher than that of the pre-mixed air. When the relative humidity during the cooling step is between 45% RH and 60% RH, water can be sprayed on the surface of the baked food before the cooling step.

The baked food is cooled in the cooling chamber at high humidity in the cooling step, and then plainly wrapped and freeze-stored in a freezing box at below the freezing point and high humidity in the first freezing step. The cooling step can include cooling the fresh baked food in the atmosphere of high humidity in which the temperature difference from an entrance to an exit of the cooling chamber is within ±5° C. to bring the crust temperature to room temperature, and subsequently freezing the same rapidly in the first freezing step. The first cooling step can include cooling the baked food for less than 60 minutes in the cooling chamber while the humidity in the cooling chamber is kept above 90% RH to bring the surface temperature of the baked food to near 30° C.

The baked food can be freeze-stored in the atmosphere of −30 to −40° C. to make the core temperature −10° C. and below.

DETAILED DESCRIPTION

Preferred embodiments according to the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
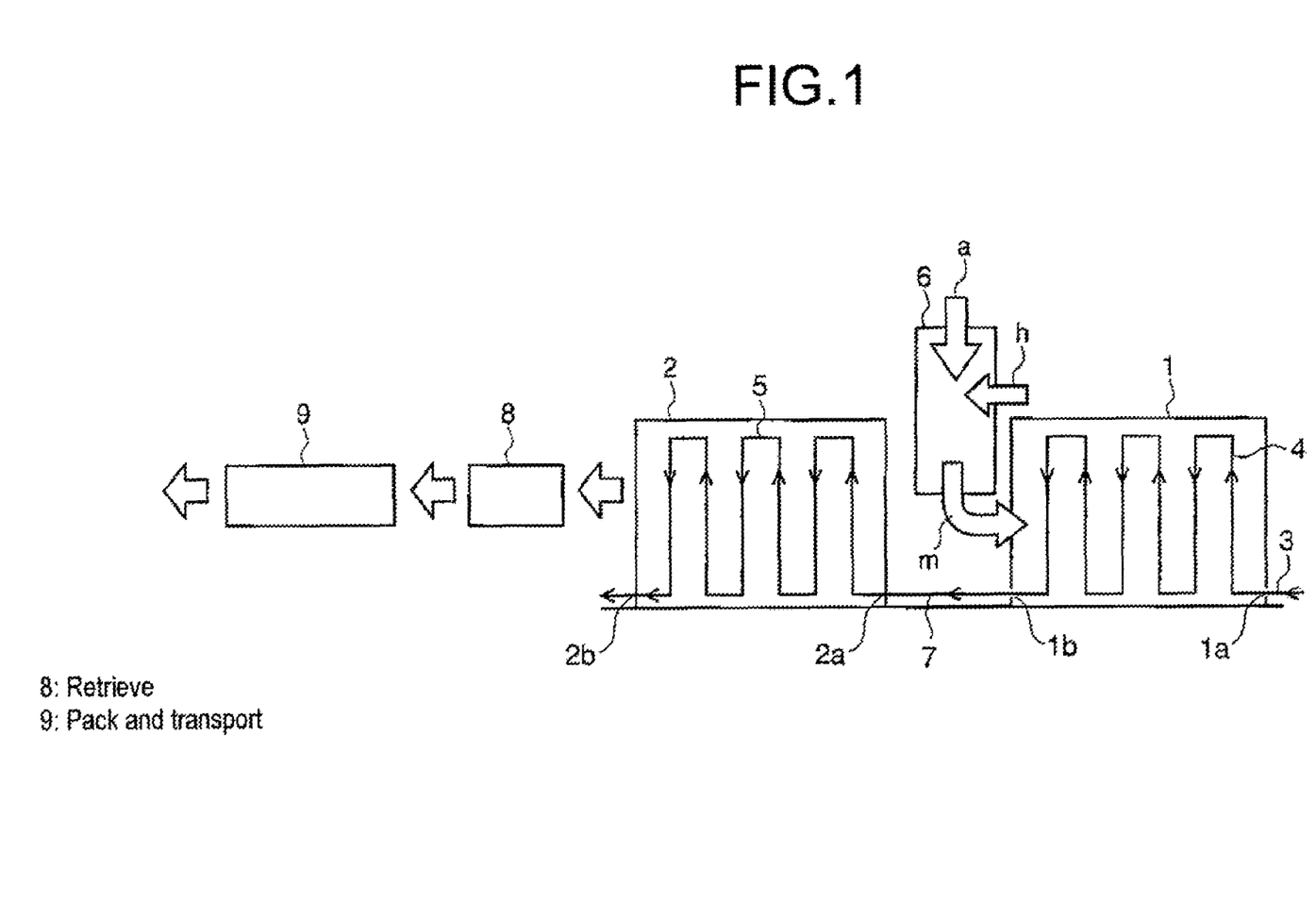
FIG. 1 schematically illustrates an apparatus for freeze-storing baking food according to the present invention.

Referring to FIG. 1, a freeze-storing apparatus for cooling and freezing baked food includes a cooling chamber 1 for cooling baked food in high or medium humidity, a freezing chamber 2 for freezing baked food, and a conveyor 3 for conveying baked food. The cooling chamber 1 is configured to be sealed hermetically so that desired temperature and humidity can be maintained inside. The freezing chamber 2 also is sealed hermetically so that temperature inside can be maintained at freezing temperature and below, and desired humidity. The conveyor 3 transfers baked food through the cooling chamber 1 and the freezing chamber 2.

Here, baked food or goods refer to fully baked or half baked bread and confectionary. In both instances, the crust part is fully baked to prevent water from being absorbed inside when spraying water on the crust. Moreover, humidity means relative humidity (RH) and high humidity means that the relative humidity (RH) is 65% and above, and medium or mid-humidity means that the relative humidity is 45-60% RH.

In freeze-storing baked goods, the most important thing is to keep the constant humidity of the core of baked food. Therefore, it is necessary to cool the baked food to bring the core temperature 30 to 35° C. by maintaining the temperature and high humidity in the cooling atmosphere. The freshly baked food can be cooled in the cooling chamber at 90% RH and above thus to bring the surface temperature of the baked food to near 30° C. Freshly-baked bread is laid in the cooling chamber or traveled in the cooling chamber of high humidity, thereby lowering its temperature near room temperature with enough moisture maintained in the crust. Thus, baked food can be processed, maintaining excellent crust condition and preventing crust flaking. When the humidity is between 45% RH and 60% RH, water can be sprayed on the surface of the baked bread before the cooling process. By spraying water, only the water from the surface of baked food evaporates, preventing the water evaporation from the inside of baked food, and keeping the appropriate moisture inside even when the surrounding is at mid-humidity, i.e., 45 to 60% RH.

The conveyor 3 is formed of vertical conveyors 4, 5 and horizontal conveyor 7. The conveyor 3 is in the form of a vertical conveyor 4, 5 inside the cooling and freezing chambers 1, 2 and is configured to move in the vertical direction. Its speed can be adjusted so that the baked food can travel on the conveyor in the chambers 1, 2 for a desired period of time.

A pre-mixed air chamber 6 can be located at the exit side of the cooling chamber 1. The chamber 6 takes in air a and produce pre-mixed air m by spraying warm water h to the air a. The pre-mixed air m is sprayed in the atmosphere on the exit side of the cooling chamber 1. In this case, the temperature of the sprayed water h is preferably higher than that of the pre-mixed air. Introducing the pre-mixed air in the exit side of the cooling chamber 1 prevents temperature drop as the water contained in the pre-mixed air evaporates taking evaporative latent heat from the surrounding. In the cooling chamber 1, temperature of the atmosphere on the exit side is maintained by introducing the pre-mixed air m of high humidity and high temperature from the pre-mixed air chamber 6. When water contained in the pre-mixed air m evaporates taking evaporative latent heat from the surrounding, the pre-mixed air of high humidity and high temperature provides heat to maintain the atmospheric temperature on the exit side of the cooling chamber 1. Therefore, the cooling chamber 1 can be maintained approximately at room temperature and high humidity on both the entrance and exit sides.

With this structure, baked food is placed on the conveyor 3 and enters the cooling chamber 1 from the entrance 1a. The baked food is conveyed through the cooling chamber 1 on the vertical conveyor 4 at prescribed speed for a desired period and is cooled in the cooing chamber 1. The baked food comes out from the exit 1b of the cooling chamber 1 and enters the freezing chamber 2 from the entrance 2a on the horizontal conveyor 7. The baked bread is carried through the freezing chamber 2 on the vertical conveyor 5 to move in the vertical direction inside the freezing chamber 2, thereby freeze-storing the baked bread to the temperature below the freezing point, i.e., −30 to −40° C. The baked food is freeze-stored in the atmosphere of −30 to −40° C. to make the core temperature −10° C. and below. The baked bread coming out from the exit 2b of the freezing chamber 2 is retrieved at station 8 packed and shipped at station 9 to stores such as convenient stores.

The constant temperature and high humidity inside the cooling chamber 1 is maintained by introducing the pre-mixed air m of high humidity and high temperature. The pre-mixed air provides heat and humidity to maintain the constant temperature and high humidity inside the chamber 1 as the water contained in the pre-mixed air m evaporates taking evaporative latent heat from the surrounding. Therefore, the cooling chamber 1 is maintained approximately at room temperature and high humidity on both the entrance and exit sides, and the baked food can be cooled, lowering the core temperature to 30 to 50° C. and maintaining high humidity. The temperature of the freezing chamber 2 is kept below the freezing point of baked food, e.g., −30 to −40° C. so that even large bread can be frozen to below the freezing point.

Figure 2:
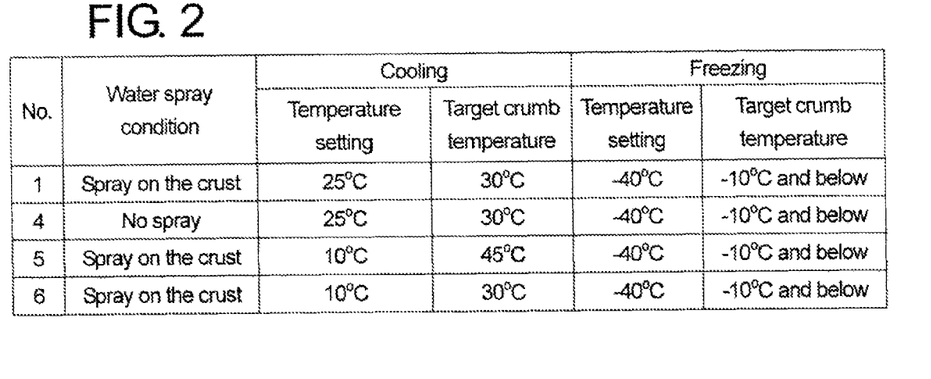
FIG. 2 is a table showing the test conditions.
Figure 3:
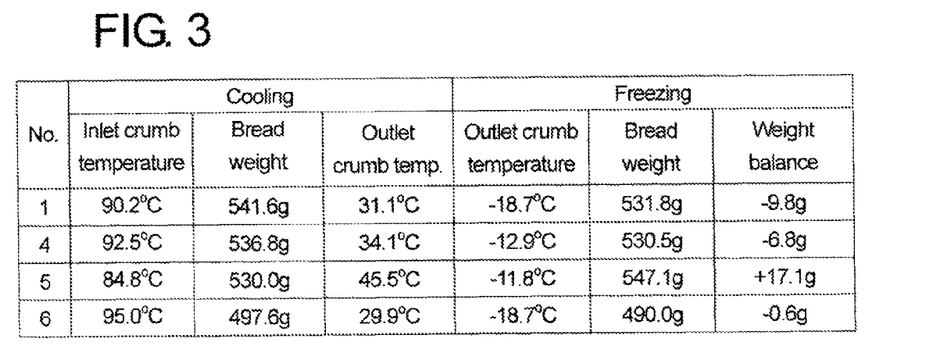
FIG. 3 is a table showing the cooling/freezing temperature.
Figure 4:
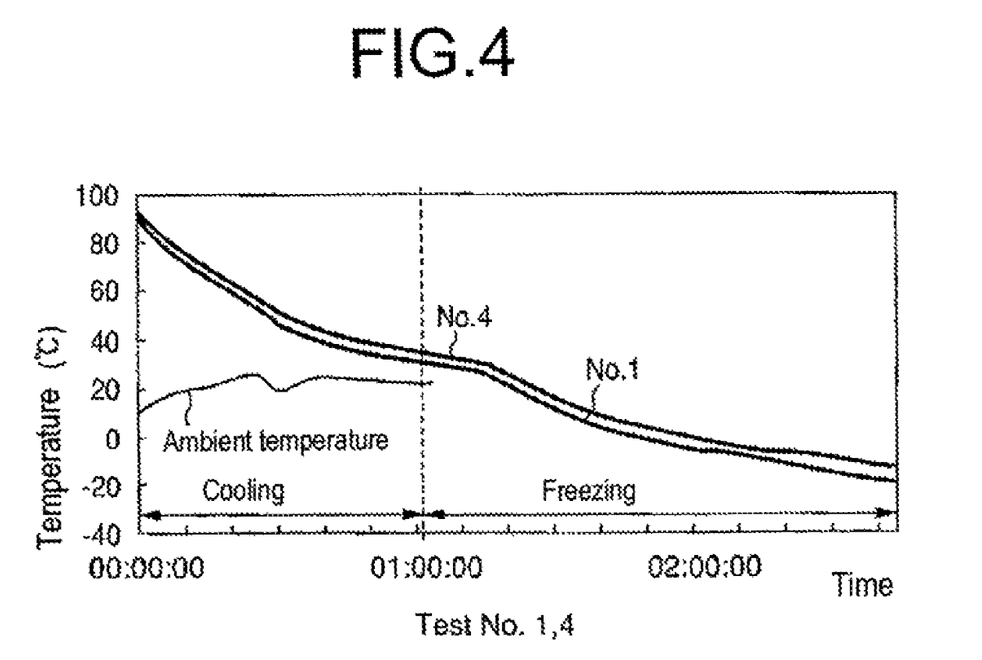
FIG. 4 is a graph showing the transition of cooling/freezing temperature in test Nos. 1 and 4.
Figure 5:
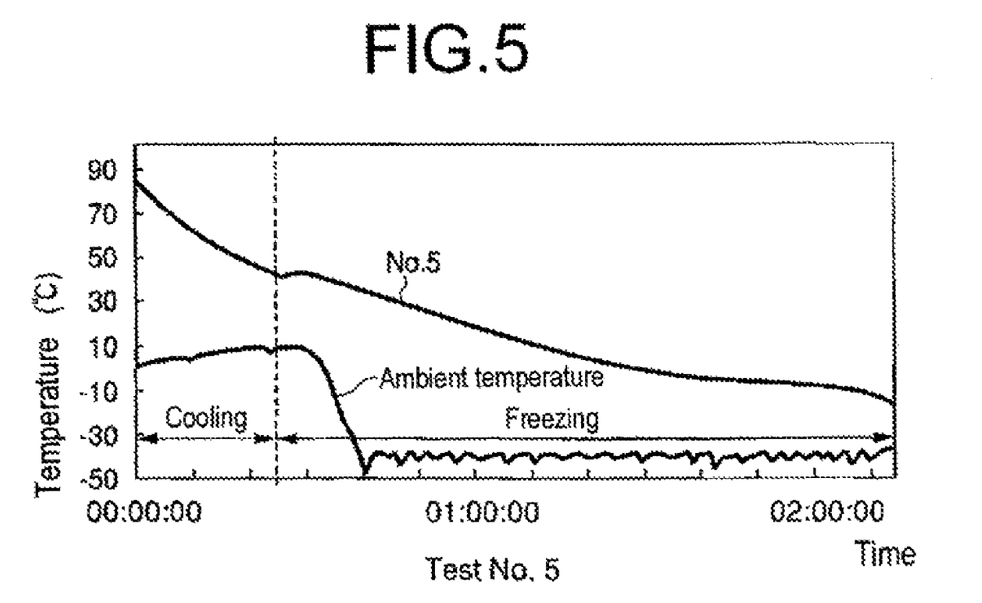
FIG. 5 is a graph showing the transition of cooling/freezing temperature in test No. 5.
Figure 6:
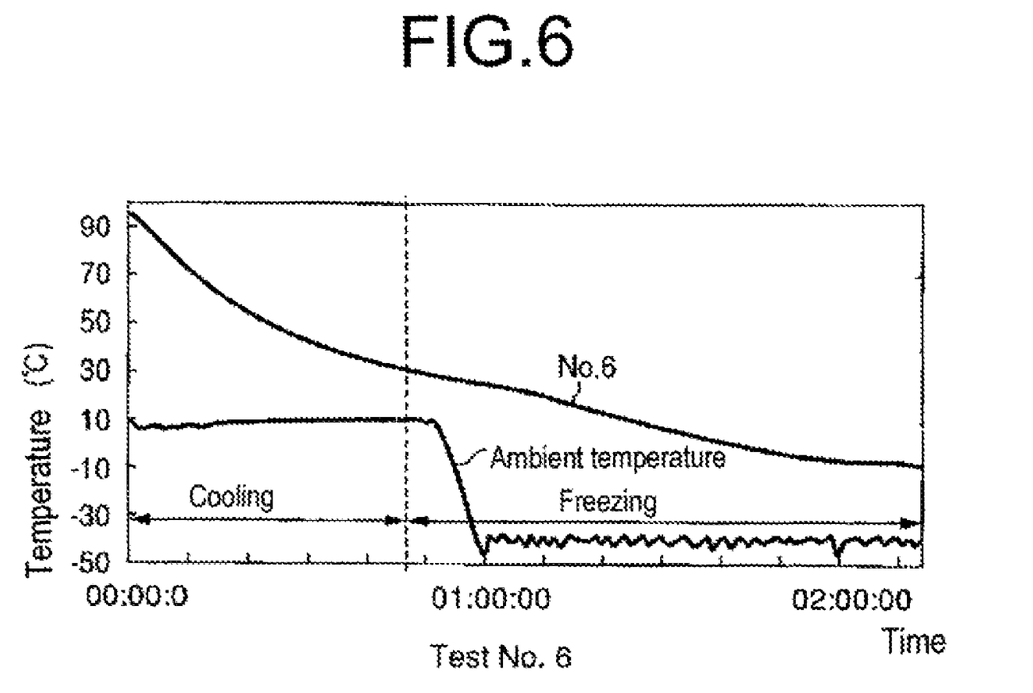
FIG. 6 is a graph showing the transition of cooling/freezing temperature in test No. 6.
Figure 7:
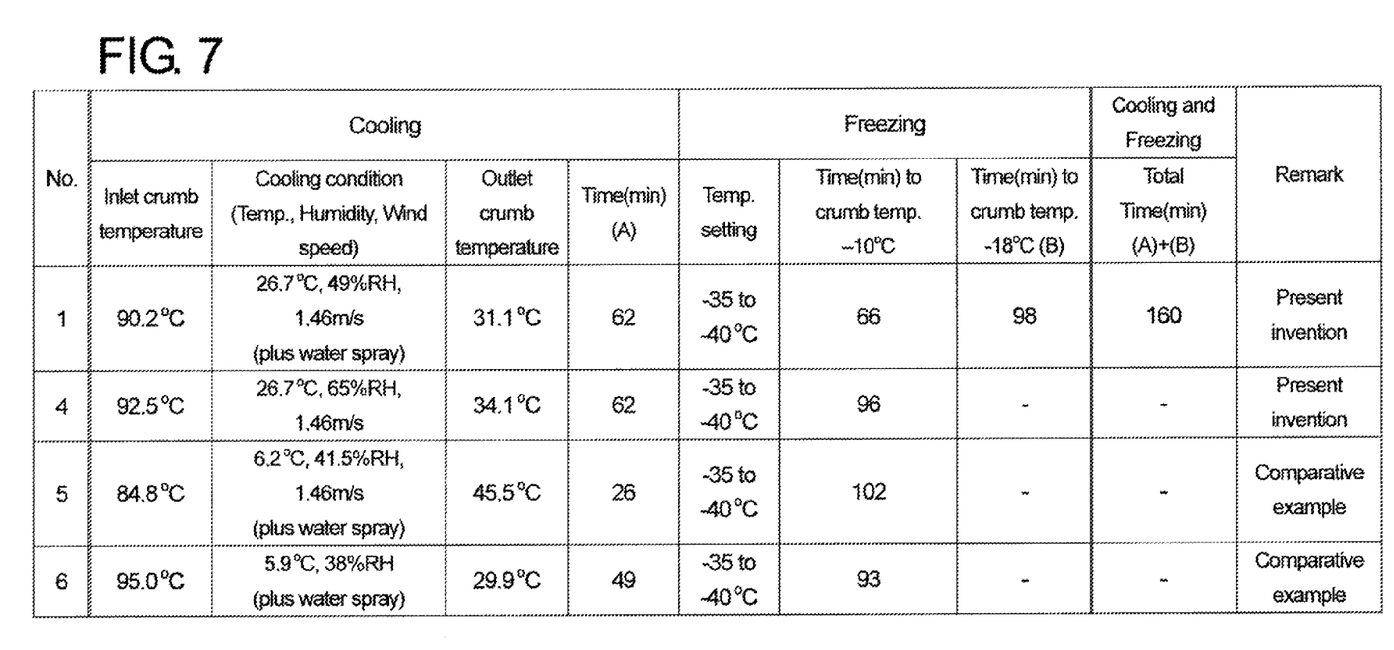
FIG. 7 is a table showing the test results.

The result of cooling and freezing tests is described below. Half-baked Zopf (braided bread) (500 g/unit), i.e., partially baked, was tested under various conditions. Zopf is rich bread made from flour 100, salt 2, yeast 0.8, water 62, fat 5, egg 5 and others in weight ratio. After mixing ingredients and fermenting the dough, bread was baked for the primary baking. The primary-baked bread was divided into one for spraying water and the other for no spraying on the crust, and cooled and frozen under the conditions shown in FIG. 2. The bread was baked in an oven at a store for the final baking (175° C. for 11 min.→190° C. for 5 min) and evaluated. The result of the tests is shown in FIGS. 3-7.

In the sensory test, Test No. 1 showed the best result and Test No. 4 showed the second best result (showed water spots partially). The bread of test No. 5 came out too soft and loose and its color was bad. The bread of Test No. 6 had thick crust and the quality was poor. As this sensory test shows, good result was obtained from Test Nos. 1 and 4 in which during the cooling process the temperature and humidity was kept high at 26 to 27° C. and 49% RH plus water spray in Test No. 1 and 65% RH in Test No. 4 and cooling time was long, 62 minutes, and after the cooling process the core temperature was kept at 30 to 35° C. This test was carried out using half-baked bread. In the case of testing fully baked bread, the fully baked bread whose crust was sprayed with water did not show crust flaking maintaining good quality as the crust was hard and kept the water out, preventing deterioration.

Referring to FIGS. 8-10B, bread baked in the baking process 11 having a crust temperature 88 to 96° C. is stored in the cooling chamber in which a humidifying process 12 is performed. In the humidifying process 12, the baked bread at high temperature is highly humidified inside the cooling chamber approximately at 34° C. and above 95% RH, and in a cooling process 13 the baked bread is cooled inside the chamber of high temperature and high humidity for about 60 minutes to lower the crust temperature to about 30 to 33° C. In the humidifying process 12 and the cooling process 13, freshly-baked bread at high temperature is cooled in the cooling chamber, thereby lowering its temperature near room temperature while holding enough moisture in the crust of the baked bread.

Figure 8:
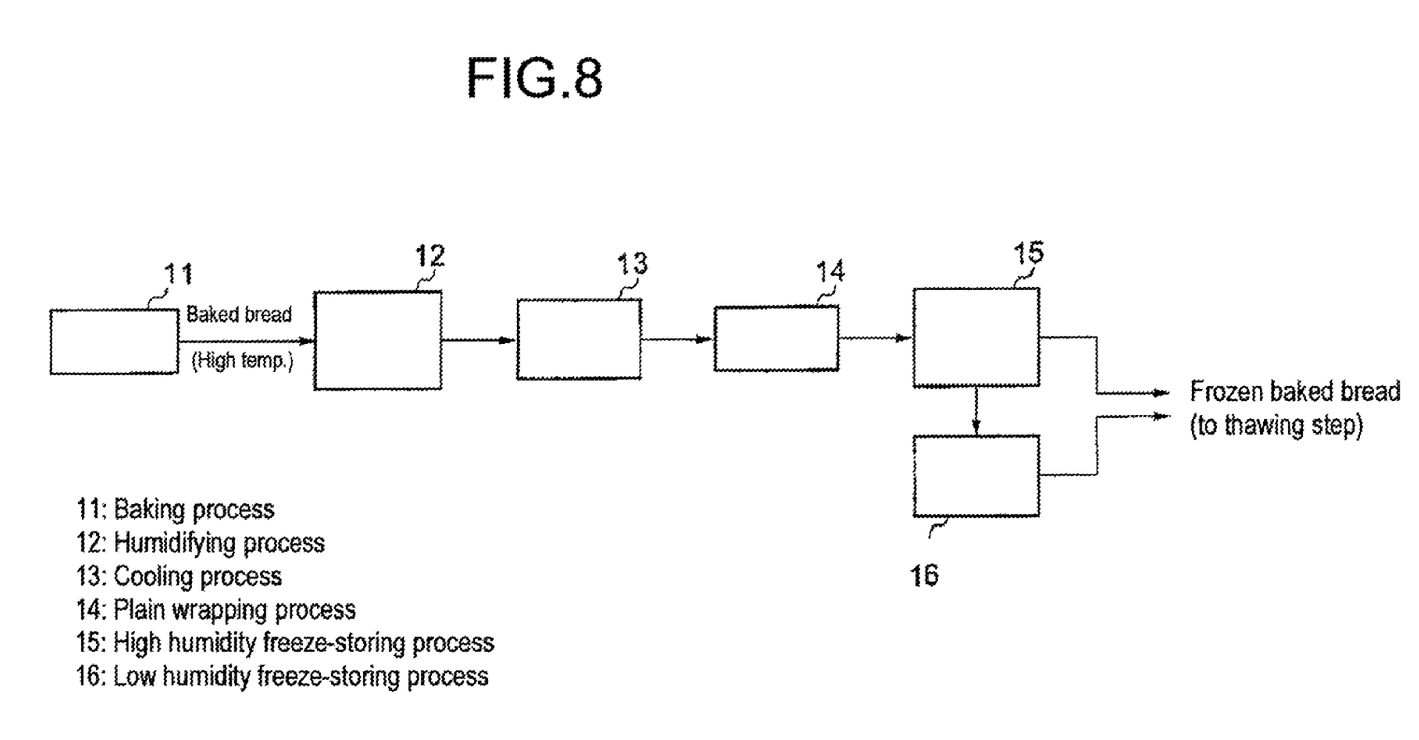
FIG. 8 schematically illustrates a freeze-storing system for baked food according to the present invention.

After the cooling process, the baked bread is plainly wrapped and conveyed into the freezing chamber. Here, "plainly wrapped" means wrapping baked food plainly enough to prevent water evaporation from the surface layer between the cooling chamber and freezing chamber. By plainly wrapping the baked bread coming out of the cooling chamber, the water evaporation from the crust is prevented while conveying the baked bread from the cooling chamber to the freezing chamber.

The freezing chamber is controlled such that the temperature inside is −17 to −20° C. and the relative humidity is 50 to 70% RH. Inside the freezing chamber has a freeze box controlled to be at the temperature of −17 to −19° C. and high relative humidity, 80 to 85% RH. The baked bread is stored in the freezing box during a high-humidity freeze-storing process 15. By performing the high-humidity freeze-storing process 15, the baked bread is freeze-stored while holding enough moisture in the crust, thereby retaining good quality. It is also possible to cool freshly baked bread slowly in the high-humidity atmosphere to bring the crust temperature to room temperature and then to freeze the cooled bread rapidly. Here, cooling "slowly" means to cool the baked food at a slow speed so that the temperature difference from the entrance to the exit of the cooling chamber is small (within ±5° C.). The cooling period of the baked food traveling from the entrance to the exit of the cooling chamber can be 35 to 80 minutes.

The humidifying process 12 and the cooling process 13 are performed on freshly baked bread so that its temperature is lowered near to the room temperature while maintaining enough moisture in the crust, and the plain wrapping process is performed for preventing water evaporation from the crust. Then the high-humidity freeze-storing process 15 is performed by storing the plainly wrapped bread in the freezing box in which the temperature is kept below the freezing point (−17 to −20° C.) and the humidity is kept high at 80 to 85% RH. Thus, the baked bread maintains enough moisture in the crust from baking to freeze-storing, thereby maintaining good crust quality and preventing crust flaking, and further freeze-storing for long period while maintaining good sensory condition.

According to another process, the baked bread can be sent to the high-humidity freeze-storing process 15 and then to the lower-humidity freeze-storing process 16. In the high-humidity freeze-storing process 15, the baked bread is freeze-stored for a short period of time, e.g., two days in the freezing box of low temperature and high humidity inside the freezing chamber of low temperature and lower humidity. Next in the lower-humidity freeze-storing process 16, the baked bread is further freeze-stored for longer period of time than the high-humidity freeze-storing process 15, in which the temperature is kept below the freezing point of bread with the relative humidity of 50 to 70% RH.

In many cases, baked bread is freeze-stored for a short period and shipped to stores. However, by performing the high-humidity freeze-storing 15 even for a short period, baked bread can be freeze-stored holding enough humidity in the crust and shipped to stores without quality deterioration.

Figure 9:
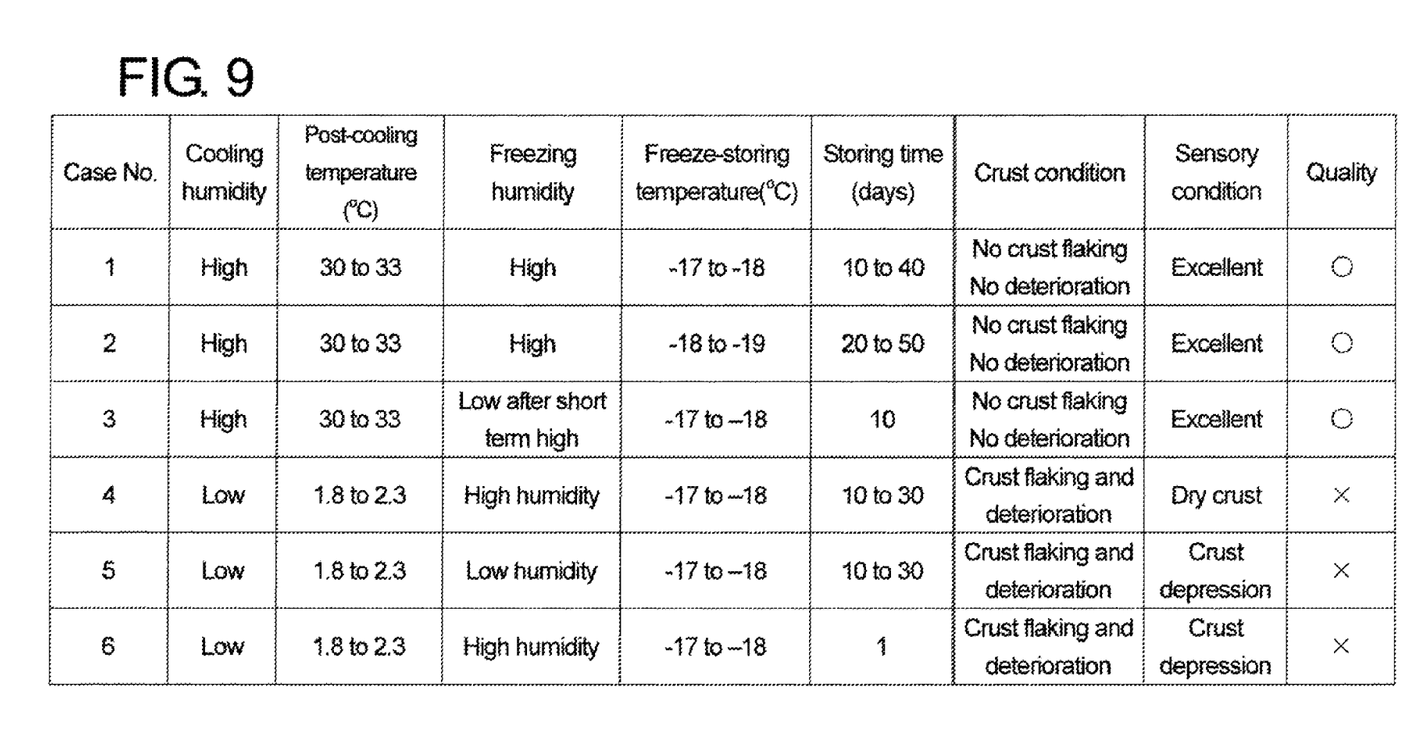
FIG. 9 is a table showing a comparison of evaluation test results of freeze-stored baked bread.

FIG. 9 shows a comparison of evaluation test results of freeze-stored baked bread and non freeze-stored baked bread. FIG. 9 also shows freezing conditions and the sensory evaluation. Half-baked Zopf (braided bread) (500 g/unit), which is partially baked bread, was tested under various conditions. The bread used for the test was baguette made from flour 100, salt 1.9, yeast 1.0, water 63.3 in weight ratio. After mixing ingredients well to make the dough, the dough is primary-fermented for 2 hours at 28° C., punched down for pushing the air out, final-fermented for 1 hour at 30-35° C., and baked in the oven for 20 to 25 minutes at 230° C.

In FIG. 9, Case Nos. 1-3 are freeze-stored according to the present invention. Case Nos. 4-6 are freeze-stored according to comparative examples. Case Nos. 1 and 2 were processed in the humidification process 12, the cooling process 13 inside the cooling chamber, and the high-humidity freezing process 15 inside the freezing box. Case No. 3 was processed in the high-humidity freezing process 15 inside the freezing box followed by the lower-humidity freeze-storing process 16. Bread in Case Nos. 1 and 2 showed no defect such as crust flaking and retained great shape and excellent taste. On the other hand, baked bread of case Nos. 4-6 showing the comparative examples, which was not processed in the humidifying process 12 or cooling process 13 showed defects in shape and taste after freeze-storing.

Figure 10A:
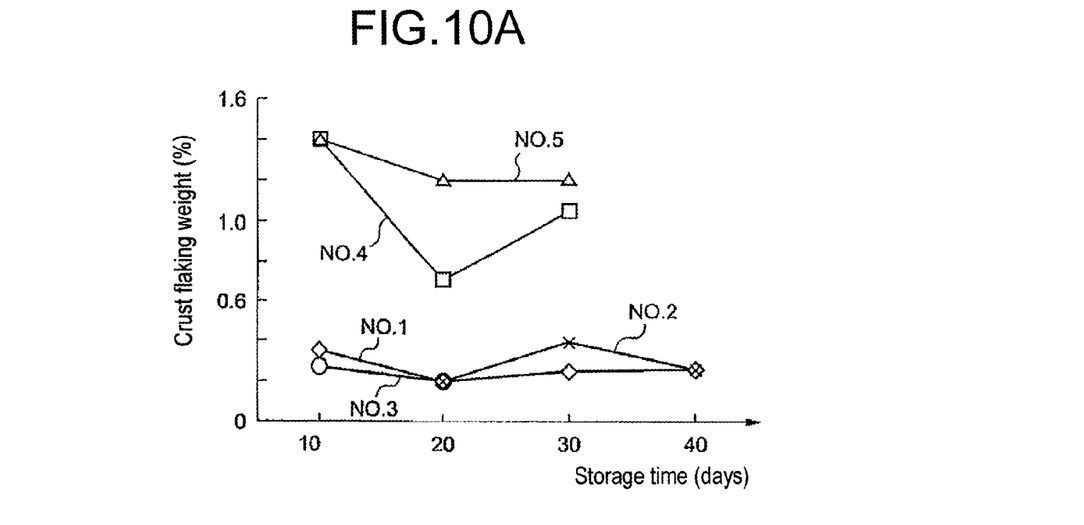
FIGS. 10A and 10B are graphs illustrating test results regarding crust flaking of freeze-stored baked bread.
Figure 10B:
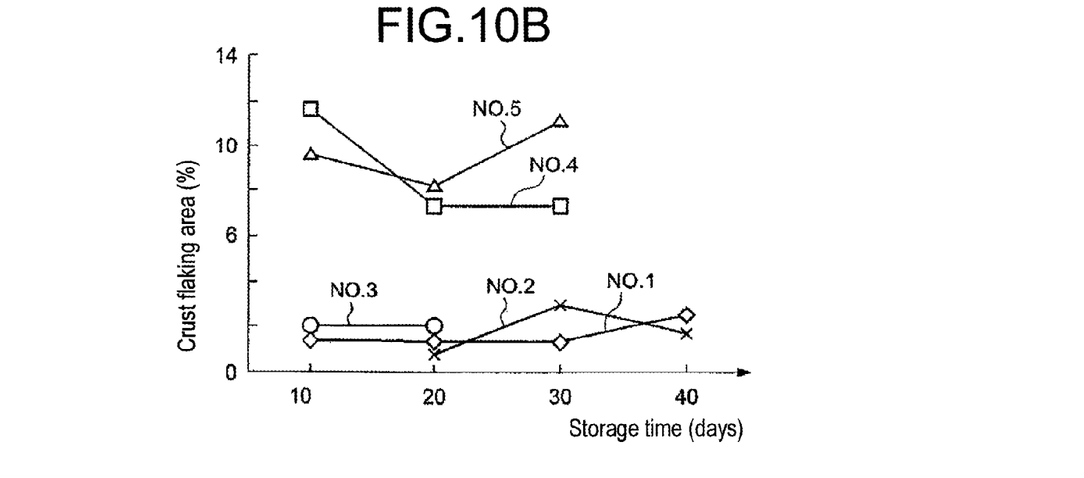

FIG. 10A shows the relation between the storing period and the crust flaking percentage in weight and FIG. 10B shows the relation between the storing period and the crust flaking percentage in area. As apparent from FIGS. 10A and 10B, crust flaking in Case Nos. 1-3 is suppressed to ⅓ of the comparative examples of Case Nos. 4-5.

An apparatus and a method for freeze-storing baked foods including baked bread allows the baked food to be freeze-stored for a long time, while maintaining its good crust condition without crust flaking, and good sensory condition.

Fresh baked food is cooled in a humidified atmosphere, and freeze-stored at temperature lower than the freezing point, namely at the atmosphere of −30 to −40° C. to make the core temperature −10° C. and below. Baked food is cooled to make the core temperature 30 to 35° C. in the atmosphere in which the cooling space is maintained highly humid at 20 to 28° C. and 65% RH and above (45% RH and above in the case of water-spraying the crust) even when the pre-mixed air is introduced therein. As a result, baked food can be freeze-stored maintaining excellent texture, flavor, and softness without deterioration in quality.

When the humidity is between 45% RH and 60% RH, water can be sprayed on the surface of the baked bread before the cooling step. By spraying water, only the water from the surface of baked food evaporates, preventing the water evaporation from the inside of baked food, and keeping the appropriate moisture inside even when the surrounding is at mid-humidity, i.e., 45 to 60% RH.

Further, freshly-baked food at high temperature can be cooled unattended in the atmosphere of high humidity such as inside the cooling chamber of high humidity, thereby lowering its temperature near room temperature, holding enough moisture in the crust of the baked food. By plainly wrapping the baked food after the cooling step, water evaporation from the crust can be prevented. Further, by storing the baked food in the freezing chamber of the freezing point and below, the baked food can be cooled to the freezing point with enough moisture in the crust, thereby achieving a freeze-storing of baked food maintaining excellent quality.

Accordingly, freshly-baked food can be freeze-stored keeping enough moisture in the crust from post-baking to the freeze-storing step. Thus, the baked food maintains enough moisture in the crust from baking to freeze-storing, thereby maintaining good crust quality and preventing crust flaking, and further freeze-storing for long period maintaining good sensory condition can be achieved.

With the above configuration of the present invention, this problem of the prior art can be solved and freeze-storing of baked food becomes possible maintaining excellent texture, flavor, softness, and others.

While the present invention has been particularly shown and described with reference to preferred embodiments thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

What is claimed is:

1. A method of freeze-storing baked food comprising:
a cooling step of cooling the baked food in a cooling chamber having an atmosphere maintained at a temperature of 20 to 28° C. and humidity of 65% RH and above, the cooling step cooling the baked food so that the core of the baked food is at temperature of 30 to 35° C.;
a first freezing step of freeze-storing the baked food in an atmosphere of the freezing point and below and after the cooling step; and
a second freezing step of freeze-storing the baked food in an atmosphere of the freezing point and below and humidity lower than the first freezing step,
wherein the second freezing step is performed for a longer period than the first freezing step.

2. A method of freeze-storing baked food according to claim 1, wherein the cooling step comprises the steps of:
pre-mixing air with water spray; and
introducing the pre-mixed air into the cooling chamber,
wherein the temperature of the water spray is higher than that of the pre-mixed air.

3. A method of freeze-storing baked food according to claim 2, wherein the cooling step further comprises the steps of:
introducing the pre-mixed air into an exit side of the cooling chamber; and
controlling the temperature of the atmosphere of the exit side of the cooling chamber to be at the temperature approximately the same as that of an entrance side of the cooling chamber.

4. A method of freeze-storing baked food according to claim 1, wherein the baked food includes half-baked bread and fully baked bread, and the cooling step comprises the steps of:
pre-mixing air with warm water spray; and
introducing the pre-mixed air into the cooling chamber,
wherein the temperature of the water spray is higher than that of the pre-mixed air.

5. A method of freeze-storing baked food according to claim 1, wherein the baked food is freeze-stored in the atmosphere of −30 to −40° C. to make the core temperature −10° C. and below.

6. A method of freeze-storing baked food according to claim 1, wherein the baked food is plainly wrapped after cooled in the cooling step, and then freeze-stored in the first freezing step.

7. A method for freeze-storing baked food according to the claim 1, wherein the cooling step includes cooling the fresh baked food in the atmosphere in which the temperature difference between an entrance side to an exit side of the cooling chamber is within ±5° C., and subsequently freezing the same rapidly in the first freezing step.

8. A method of freeze-storing baked food according to the claim 6, wherein the first cooling step includes cooling the baked food for less than 60 minutes in the cooling chamber while maintaining humidity above 90% RH thus to cool the surface temperature of the baked food to near 30° C.

9. A method of freeze-storing baked food comprising:
a cooling step of cooling the baked food in a cooling chamber having an atmosphere of 45% RH or higher;
a first freezing step of freeze-storing the baked food in an atmosphere of the freezing point and below and high humidity after the cooling step; and a second freezing step of freeze-storing the baked food in an atmosphere of the freezing point and below and humidity lower than the first freezing step, wherein the second freezing step is performed for a longer period than the first freezing step, and wherein when the relative humidity of the cooling chamber during the cooling step is between 45% and 60% RH, water is sprayed on the surface of the baked food before the cooling step.

10. A method of freeze-storing baked food comprising:

a cooling step of cooling the baked food in a cooling chamber having an atmosphere of 45% RH or higher;

a first freezing step of freeze-storing the baked food in an atmosphere of the freezing point and below and high humidity after the cooling step; and a second freezing step of freeze-storing the baked food in an atmosphere of the freezing point and below and humidity lower than the first freezing step, wherein the second freezing step is performed for a longer period than the first freezing step, wherein the baked food includes fully baked bread, and wherein when the relative humidity during the cooling step is between 45% RH and 60% RH, water is sprayed on the surface of the baked food before the cooling step.

* * * * *